United States Patent [19]

Hannappel et al.

[11] Patent Number: 4,836,027
[45] Date of Patent: Jun. 6, 1989

[54] CIRCUIT FOR A SENSOR

[75] Inventors: Joachim Hannappel, Waldbrunn; Thomas Pfeifer, Eppstein, both of Fed. Rep. of Germany

[73] Assignee: VDO Adolf Schindling AG, Framkfurt am Main, Fed. Rep. of Germany

[21] Appl. No.: 123,974

[22] Filed: Nov. 20, 1987

[30] Foreign Application Priority Data

Nov. 25, 1986 [DE] Fed. Rep. of Germany ....... 3640242

[51] Int. Cl.$^4$ ............................................. G01L 19/04
[52] U.S. Cl. ............................................. 73/708; 338/3
[58] Field of Search ................. 73/708, 720, 721, 726, 73/754, 727, DIG. 4, 862.35, 862.47, 862.63, 862.65; 338/4, 3

[56] References Cited

U.S. PATENT DOCUMENTS 4,233,848 11/1980 Sato et al. ............................. 73/708

FOREIGN PATENT DOCUMENTS 0040184 3/1977 Japan ..................................... 73/708

Primary Examiner—Donald O. Woodiel
Attorney, Agent, or Firm—Martin A. Farber

[57] ABSTRACT

In a circuit for a sensor the output signal of which is dependent not only on the variable to be determined but also on the temperature, an amplifier having a temperture-dependent amplification factor is connected to the output of the sensor, and the output of the amplifier is connected to an adder circuit to which a temperature-dependent voltage can be fed. The amplifier is preferably a differential amplifier within the feedback branch of which a temperature-dependent resistor is inserted. The adder circuit is preferably formed by another differential amplifier to the inputs of which the output signal of the differential amplifier with temperature-dependent amplification, the temperature-dependent voltage and a substantially temperature-independent voltage can be fed via resistors.

8 Claims, 1 Drawing Sheet

CIRCUIT FOR A SENSOR

FIELD AND BACKGROUND OF THE INVENTION

The present invention relates to a circuit for a sensor the output signal of which is dependent on the temperature as well as on the variable to be measured.

For the determination of different physical variables, for instance a pressure, a magnetic field strength or a velocity of flow, sensors are known which supply an electrical output signal which is analogous to the physical variable. However, the output signal is frequently dependent not only on the variable to be determined but also on the temperature. This temperature-dependence consists generally in the fact that, on the one hand, the sensitivity of the sensor, and therefore the change in the output signal upon a given change in the variable to be determined, and, on the other hand, an additive component (so-called offset) are dependent on the temperature. In this connection there are differences between the individual manufactured sensors of the same type so that, upon the use of the sensors, circuits which provide compensation for the temperature errors are necessary, the degree of the specific compensation being adjustable. In the circuits known up to the present time, however, the adjustments have mutually affected each other so that an iterative and thus time-consuming procedure was necessary for the compensation.

It is an object of the present invention to provide a circuit for a sensor which permits of independent adjustment of the compensation for the temperature error of the sensitivity and offset.

SUMMARY OF THE INVENTION

According to the invention, an amplifier having a temperature-dependent amplification factor is connected to the output of the sensor (1) and the output of the amplifier is connected to an adder circuit to which a temperature-dependent voltage can be fed.

The circuit of the invention permits independent adjustments of the temperature dependences of offset and sensitivity. In this way a substantially simpler compensation of the circuit is established.

The circuit of the invention furthermore has the advantage that, for given requirements as to precision, it is still possible to compensate for the temperature errors of sensors which would otherwise have to be rejected if other circuits were used.

One advantageous feature of the invention is that the amplifier is a differential amplifier (8) within the feedback branch of which a temperature-dependent resistor (14) is inserted.

In this connection, two terminals (4, 5) which form the output of the sensor (1) can advantageously be connected to an inverting input and a non-inverting input of the differential amplifier (8).

Another feature of the invention is that an adjustable resistor (12) is connected in series with the temperature-dependent resistor (14) and another adjustable resistor (13) is connected in parallel with it.

One advantageous embodiment here consists in the temperature-dependent resistor (14) and the adjustable resistors (12, 13) forming a longitudinal branch of a T-section and a third adjustable resistor (11) forming a transverse branch of the T-section.

With this further feature a simple adjustment of the degree of compensation of the sensitivity is possible.

In accordance with another feature of the invention, the adder circuit can furthermore be fed a voltage which is substantially independent of temperature.

In this case, one advantageous embodiment, is that the adder circuit is formed by another differential amplifier (16) to the inputs of which the output signal of the differential amplifier with temperature-dependent amplification, a temperature-dependent voltage and a substantially temperature-independent voltage can be fed via resistors (15, 17-19).

A simple adjustment of the temperature compensation of the offset is established, according to another feature, by the fact that the temperature-dependent voltage can be fed to the two inputs of the additional differential amplifier over respective adjustable resistors (17, 18).

One particularly simple embodiment from the standpoint of circuit technique is possible, in accordance with one advantageous embodiment, in the manner that the temperature-dependent voltage can be derived from an operating voltage which is fed by means of a voltage divider (22, 23) the one resistor (22) of which is temperature dependent, and the temperature-independent voltage can be derived therefrom by means of another voltage divider (20, 21).

A simple compensation of the offset is possible in the manner that the divider ratio of the additional voltage divider (20, 21) can be adjusted.

Finally, a further development of the invention resides in the fact that the amplification factor of the additional differential amplifier (16) can be adjusted by means of adjustable resistors (25-27) which are arranged in the feedback branch. In this way the overall amplification of the circuit according to the invention can be adjusted.

BRIEF DESCRIPTION OF THE DRAWING

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
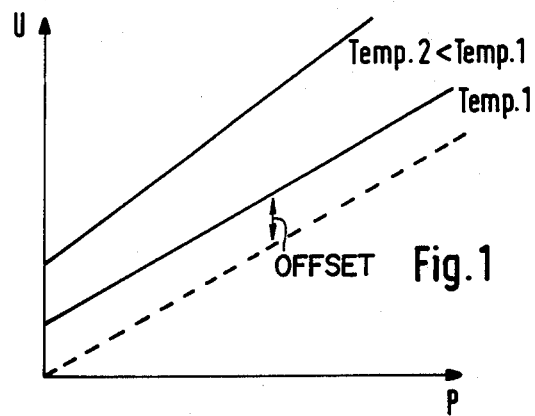
FIG. 1 is a diagram showing the dependence of the output voltage of a pressure sensor on the pressure and the temperature.

As can be noted from FIG. 1, the output voltage V as a function of the pressure P of the pressure sensor increases strongly at a lower temperature Temp 2 than at a higher temperature Temp 1. Furthermore the offset, i.e. the output voltage at the value P=0 is dependent on temperature. The output voltage of the circuit of the invention is however, to be substantially independent of temperature. Furthermore so-called zero offset as indicated by the dashed line is advantageous.

Figure 2:
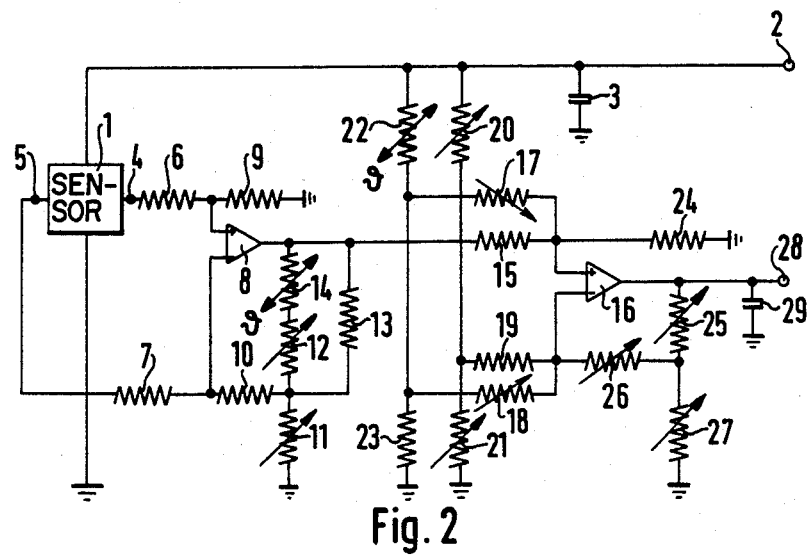
FIG. 2 is a circuit diagram.

FIG. 2 shows a circuit which is adapted to a piezoelectric pressure sensor 1 but is suitable, however, in principle also for other sensors. The sensor 1 receives an operating voltage via a terminal 2, a capacitor 3 filtering out any possible voltage peaks. The output terminals 4, 5 of the sensor 1 are connected via a resistor 6, 7 to the inputs of a differential amplifier 8. The non-inverting input of the differential amplifier 8 is furthermore connected to ground potential via a resistor 9.

Between the output and the inverting input of the differential amplifier 8 namely in its feedback branch, there is arranged a resistance network consisting of the resistors 10, 11, 12, 13 and the temperature-dependent resistor 14. The latter has the effect that the resultant amplification factor is dependent on temperature.

Thus the sensitivity of the sensor is temperature-compensated. This presupposes that the temperature-dependent resistor 14 in each case has the same temperature as the sensor 1. This is assured in advantageous manner if the circuit of the invention is miniaturized and forms a compact unit with the sensor. Hybrid technique in which the passive components, including the wirings are produced as film circuits is advantageous for this, the active components, i.e. the operational amplifiers, being inserted as chips.

The output voltage of the differential amplifier 8 is fed via a resistor 15 to the non-inverting input of another differential amplifier 16. The latter together with the resistor 15 and the resistors 17, 18 and 19 forms an adding or subtracting circuit to which, on the other hand, a substantially temperature-independent voltage is fed, by means of the voltage divider 20, 21 and, on the other hand, a temperature-dependent voltage is fed by means of the voltage divider 22, 23. For this purpose, the resistor 22 is developed as temperature-dependent resistor.

The non-inverting input of the differential amplifier 16 is furthermore connected to ground potential via a resistor 24. Between the output and the inverting input of the differential amplifier 16 there is connected a T-section consisting of the resistors 25, 26 and 27 which essentially determines the amplification factor of the other differential amplifier 16. The output voltage of the circuit can be obtained at the output 28. In order to prevent disturbances by voltage peaks, the output 28 is connected to ground potential via a capacitor 29.

For the balancing of the circuit the output voltage of the differential amplifier 18 is measured, or brought to a desired value by adjustment of the resistor 11, at a first temperature, for instance 85° C., and a predetermined pressure. Thereupon, at the same pressure but a different temperature, for instance room temperature, the same output voltage is set by adjusting the resistors 12 and 13. In this way the degree of compensation for the temperature dependence of the sensitivity of the sensor is adjusted for.

The degree of compensation of the temperature dependence of the offset voltage of the pressure sensor 1 is adjusted by adjusting the values of the resistors 17 and 18 also at a predetermined value of the pressure and at different temperatures. The offset voltage is then compensated for at a predetermined temperature by adjusting the ratio of the resistors 20 and 21.

By means of the resistors 25, 26 and 27 the total amplification of the circuit can be adjusted. The adjusting of the individual resistors is preferably effected by laser beam.

We claim:

1. A compensation circuit for a sensor, the sensor having an output signal dependent on temperature as well as on a variable to be measured, the circuit comprising
an amplifier having a temperature-dependent amplification factor and being connected to an output of the sensor;
an adder circuit;
a source of a temperature dependent voltage, an output of the amplifier being connected to the adder circuit, and the temperature-dependent voltage being fed to the adder circuit for outputting a compensated sensor signal from the adder circuit; and wherein
said amplifier is a differential amplifier having a feedback branch comprising a temperature-dependent resistor; and
the sensor has two terminals which form the output of the sensor and are connected to to an inverting input and a non-inverting input of the differential amplifier; the circuit further comprising
a first adjustable resistor connected in series with the temperature-dependent resistor; and
a second adjustable resistor connected in parallel with the first adjustable resistor.

2. A circuit according to claim 1, wherein
said feedback branch of said differential amplifier includes a circuit in the form of a T-section; and
said temperature-dependent resistor and said first and said second adjustable resistors form a longitudinal branch of the T-section, here being a third adjustable resistor forming a transverse branch of the T-section for adjustment of a degree of compensation of the sensitivity of the sensor.

3. A compensation circuit for a sensor, the sensor having an output signal dependent on temperature as well as on a variable to be measured, the circuit comprising
an amplifier having a temperature-dependent amplification factor and being connected to an output of the sensor;
an adder circuit;
a source of a temperature dependent voltage, an output of the amplifier being connected to the adder circuit, and the temperature-dependent voltage being fed to the adder circuit for outputting a compensated sensor signal from the adder circuit; and
a second voltage source providing a second voltage which is substantially independent of temperature, the second voltage being applied to the adder circuit.

4. A circuit according to claim 3, wherein
said adder circuit comprises a second differential amplifier having an input receiving an output signal for the first-mentioned differential amplifier, there being a set of resistors for coupling the temperature-dependent voltage and the substantially temperature-independent voltage to the adder circuit.

5. A circuit according to claim 4, wherein
said set of resistors includes adjustable resistors for feeding the temperature-dependent voltage to inputs of said second differential amplifier.

6. A circuit according to claim 5, wherein
said first-mentioned voltage source includes a voltage divider having a temperature-dependent resistor for supplying the temperature-dependent voltage; and
said second voltage source includes a voltage divider for providing the temperature-independent voltage.

7. A circuit according to claim 6, wherein
the divider ratio of the second-mentioned voltage divider is adjustable.

8. A circuit according to claim 4, wherein
said second differential amplifier includes a feedback branch having a set of adjustable resistors; and
an amplification factor of said second differential amplifier is adjustable by means of said adjustable resistors.

* * * * *